United States Patent [19]

Suzuki et al.

[11] 4,367,463
[45] Jan. 4, 1983

[54] INFORMATION MARK DISPLAY DEVICE

[75] Inventors: Takashi Suzuki, Yokohama; Nozomu Kitagishi, Kawasaki, both of Japan

[73] Assignee: Canon Kabushiki Kaisha, Tokyo, Japan

[21] Appl. No.: 221,210

[22] Filed: Dec. 30, 1980

[30] Foreign Application Priority Data

Jan. 10, 1980 [JP] Japan .................................. 55-1569

[51] Int. Cl.³ ............................................. G03B 17/20
[52] U.S. Cl. ................................. 340/700; 340/691; 354/53
[58] Field of Search .................... 354/53, 54, 55, 289; 340/691, 700, 702, 705, 706, 707, 710

[56] References Cited

U.S. PATENT DOCUMENTS 4,045,794 8/1977 Ohta .................................... 340/691
4,294,529 10/1981 Sato et al. ............................. 354/53

Primary Examiner—Alvin H. Waring
Attorney, Agent, or Firm—Toren, McGeady and Stanger

[57] ABSTRACT

An information mark display device with the mark representative of information to be displayed being formed in at least one of the surfaces of a flat transparent substrate in a portion thereof and arranged upon illumination by light from a lamp to present the information display. The information mark display presenting portion is constructed from an array of microprisms, and the microprisms are so oriented that at least one of the inclined surfaces of each microprism deflects the rays of light from the lamp into the field of view of the finder.

12 Claims, 9 Drawing Figures

INFORMATION MARK DISPLAY DEVICE

BACKGROUND OF THE INVENTION

1. Field of the Invention

This invention relates to information mark display devices, and, more particularly, to information mark display devices of the type in which a mark representing information to be displayed is formed in a portion of at least one surface of a transparent substrate plate and the display of the mark is presented by controlling the illumination light arrangement.

2. Description of the Prior Art

It is already known in the art to provide a wide variety of information mark display devices as the means for displaying different types of information in the field of view of the finder in a camera or the like, by which the required information display is presented when the necessity arises as the mark appears to ovelap the object image. By the way, in application of such information mark display device to the finder-built-in information display means in a camera or the like, it is thought necessary that when in the normal or display-absent position, the provision of the information mark display presenting portion should not contribute to any bad influence such as so-called "darkening" on the appearance of an intrinsic image to be observed in the field of view of the finder, that is, the object image. From this point of view, the applicant of this application has already proposed such information mark display device in the two forms, one of which makes use of diffraction means comprising a volume hologram in the information mark presenting portion thereof, and the other of which makes use of diffraction means comprising a relief hologram, in Japanese Patent Applications No. Sho 51-106886 and No. Sho 53-92234 respectively. According to these proposals, the mark is recorded on a transparent substrate in various forms of a diffraction grating depending upon the informations to be displayed. When the diffraction grating mark is illuminated, the diffracted light goes to the axis of observation (that is, in the case of the camera, to the direction of the finder optical axis) so that the desired display of the information mark is presented as overlapping an image to be observed (that is, the finder image). The characteristic feature of this diffraction grating type information mark display device is that when the illumination light is not given, the mark bearing portion exerts no bad influence on the image to be observed (the finder image). In practice, this is realized by limiting the efficiency of the diffraction grating to a low value with the advantage that an image bearing light beam which is to provide the finder image is not so much diffracted as to darken the image or to produce the so-called "obscuring" phenomenon. In actual practice, however, the diffraction grating must be of a very fine pattern on the order of 1000 lines/mm as determined by the relation between the angle of incidence of the illumination light beam on the mark and the angle of emergence of the information bearing light reproduced thereby. Therefore, high-precision manufacturing techniques are required.

On the other hand, even with the use of the information mark device as the means of displaying information in the camera finder, it is desired in some cases, depending upon what information is to be displayed, that even when the above-described information mark display presenting portion is deprived of the illumination light from the illumination light source, it is left sufficiently visible, thus functioning to display an alternate information. For example, an auto-focus camera is selected to employ such information mark display device for the purpose of indicating when the photo-taking lens is sharply focused. In this case, it is very significant that the mark pattern of that information mark display presenting portion itself is made to also serve as a mark for the effective area of view-field of focus detection within the object space. In such case, it is required that even when the information mark display presenting portion is deprived of the illumination light from the illumination light source, the mark pattern of that information mark display presenting portion remains visible in the field of view of the finder. This is because even when in the display absent condition, the mark pattern of the above-described information mark display presenting portion is seen as "obscuring" in the image to be observed and the focus detecting area is always displayed to make it possible to perform the focus detecting operation. As will be understood from this fact, upon consideration of a suitable method of using the information mark device, the obscuring phenomenon produced by the mark pattern of the information mark display presenting portion can be advantageously utilized. Therefore, it may be said that the "obscuring" is allowed to take place to some extent when in the display absent condition, provided that it is used for a particular purpose.

SUMMARY OF THE INVENTION

With the foregoing in mind, it is an object of the present invention to provide an information mark display device having an information mark display presenting portion amenable to such readily available and such low unit cost production techniques as to be employed in manufacturing, for example, Fresnel lenses, for use in the single lens reflex cameras although nothing about the influences of that information mark presenting portion on the observation image when in the inoperative position except the "obscuring" is admitted of to some extent.

And, under such object, the present invention in application to an information mark display device of the type in which the information mark display presenting portion is formed in a portion of at least one surface of a flat plate-like transparent substrate to a shape corresponding to the information to be displayed and the display of information is presented by illuminating said display presenting portion with a light beam for illumination from an illumination light source, is characterized by forming the above-described mark display presenting portion with an array of microprisms while at this time at least one of the inclined surfaces of each of the microprisms is made to be a surface for information mark display, whereby the light beam for illumination from the above-described illumination light source is deflected by said inclined surface to present the display of information mark.

DETAILED DESCRIPTION OF THE PREFERRED EMBODIMENTS

The present invention will next be described in connection with preferred embodiments thereof by reference to the accompanying drawings.

Figure 1:
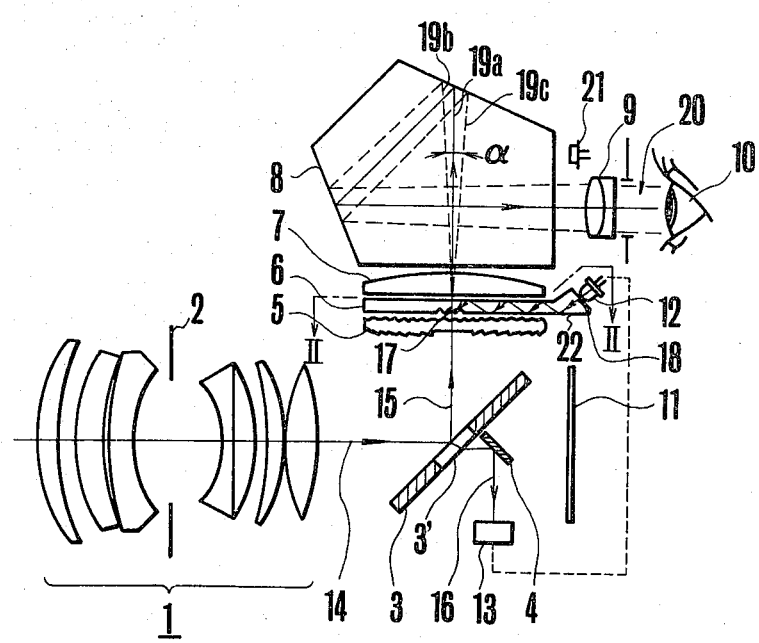
FIG. 1 is a schematic sectional view of an embodiment of a device according to the present invention applied to a single lens reflex camera equipped with a focus detecting system and serving as a focus condition display device.

Referring first to FIG. 1, there are shown the main parts of an optical system of the focus detecting device-equipped single lens reflex camera employing one form of the information mark display device of the invention as the focus adjusting condition display device. In FIG. 1, element 1 is a taking lens having a diaphragm 2; element 3 is a quick-return mirror provided with a half-mirrored portion 3' to split an image forming light beam 14 into two parts 15 and 16 of which the former is directed to a finder optical system. Element 4 is a submirror for reflecting the part 16 of the image-forming light beam to a focus detecting device 13 at a light-sensitive element for focus detection thereof; element 5 is a focusing screen having a fresnel lens and a matted surface; element 6 is a display plate for focus adjusting condition display constructed in accordance with the present invention and comprised of a flat plate-like transparent substrate. Element 7 is a condenser lens; element 8 is a pentaprism; element 9 is an eyepiece; element 10 is an observer's eye; and element 11 is a photographic film. Element 12 is a light source for illuminating an information mark display presenting portion 17 formed with an array of microprisms in the lower surface of the display plate 6 to a pattern of mark representing an information to be displayed as will be more fully described later. For use as said light source 12 a small lamp may be employed or an, LED or the like arranged to be lighted on when the focus detecting device 13 catches the occurrence of a sharp focus condition. Again, the light beam from said light source 12 enters through an introduction prism 22 to the interior of the display plate 6 at the side surface thereof, serving as a light beam 18 for illumination which propagates after total reflection from the surfaces of the display plate 6 to the display presenting portion 17 and to illuminate said display presenting portion 17. And, a portion of the light beam 18 after having illuminated the display presenting portion 17 is reflected by one inclined surface of each microprism provided in said display portion 17 to the direction of an optical axis 19a of the finder optical system, extending so as to be observed by an eye 10. It is noted that in this case it is desirable that a display light beam of rays exiting from the various points of the display portion 17 by reflection uniformly expands within an angle α defined by rays 19b and 19c at the marginal zone of the finder window 20. It is also noted that in the case of such type camera that a light sensitive element 21 for light measurement is positioned adjacent the finder optical path, the above-described display light beam is imparted with a limited directionality so that the beam does not enter said lightsensitive element 21. In actual practice, the above-described display presenting portion 17 is substantially almost coincident with the focusing surface (the matted surface of the focusing screen 5), and the above-defined angle for the common single lens reflex camera, for example, is preferably 10° or less in the longitudinal direction (in the paper) and 15° or more in the lateral direction.

Figure 2:
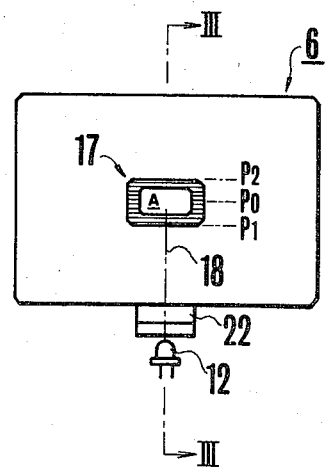
FIG. 2 is an elevational view taken along line II—II of FIG. 1 showing the display plate and the illumination light source.
Figure 3A:
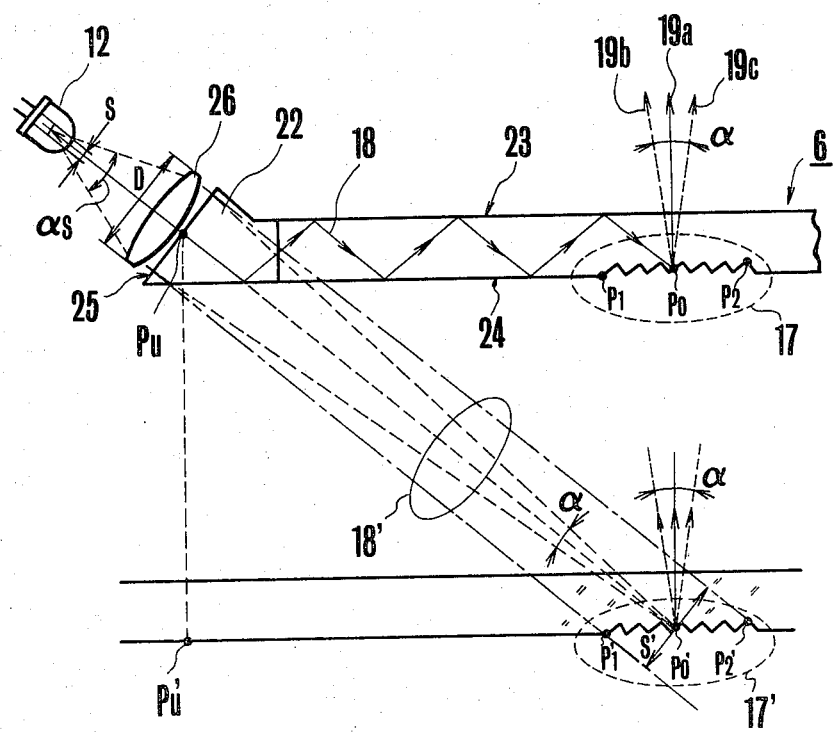
FIGS. 3(a) and 3(b) show the details of the information mark display presenting portion in the display plate of FIG. 2 with FIG. 3(a) being a view in an enlarged scale taken along line III—III of FIG. 2, and FIG. 3(b) being a similar view in a further enlarged scale of the main parts thereof.
Figure 3B:
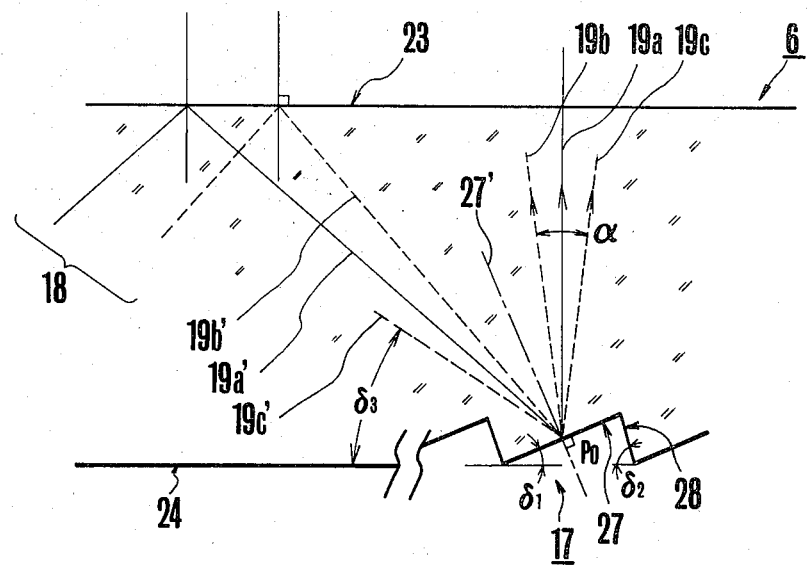

Next, explanation is given to the practical structure of the information mark display presenting portion 17 formed in the above-described display plate 6 by reference to FIGS. 2, 3(a) and 3(b).

At first, FIG. 2 shows the above-described display plate 6 and illumination light source 12 looking along a sight line II—II of FIG. 1. The information mark display presenting portion 17 is, in this instance, constructed in the form of an array of microprisms so that on the basis of the output of the focus detecting device 13 when the taking lens 1 is sharply focused, the light source 12 is lighted on to illuminate the information mark display presenting portion 17, thereby the display of the in-focus condition of the taking lens 1 is presented by the light of the illustrated information mark pattern. And, this information mark pattern defines an area A in the field of view of the finder which substantially corresponds to the region of the field of view for focus detection in the object space of the focus detecting device 13. When the illumination light source 12 is lighted off, this information mark pattern is made to indicate the focus detection field region of the focus detecting device 13 by the "obscuring" phenomenon appearing in the field of view of the finder.

The above-described information mark display presenting portion 17 is formed by an array of microprisms as has been mentioned above. In more detail, this is formed by arranging microprisms of such shape as illustrated in FIG. 3(a) in one direction to correspond with a pattern of information mark to be displayed. It is noted that the hatching at the information mark display presenting portion of FIG. 2 designates the top line of these microprisms. As will be understood from this figure, the direction of arrangement of the microprisms coincides with the optical axis.

Now, FIG. 3(a) shows, in an enlarged scale, the cross-section along line III—III of FIG. 2, where as shown in FIG. 2 letting P0 the central point of the information mark display presenting portion 17, and P1 and P2 the both ends, the conditions laid on the illumination light beam 18 are that the display presenting portion 17 is illuminated uniformly over the entire area thereof from the point P1 to P2 and the angle at which the rays of light radiating from the various points of the display portion 17 expand is on the order of α (almost corresponding to the angle α of FIG. 1) with its bisector coinciding with the optical axis. The ray of light, which is to illuminate the central point P0 of the area of the display portion 17, comes after the total reflection from the upper and lower surfaces 23 and 24 of the display plate 6 a number of times and therefrom is reflected to exit in the direction of the optical axis 19a of the finder. These conditions determine the shape of cross-section of the microprism. This will be explained in more detail below by reference to FIG. 3(b) or the enlarged illustration of the microprism.

Now letting 19a represent the finder optical axis and α the angle of coverage of the finder window, we have a minimum value of the angle of inclination $\delta_1$ of the prism when a ray of light 19b′ in the illumination light beam 18 is incident on the upper surface 23 of the display plate 6 from the inside of refractive index n at an angle near to the critical angle for total reflection and after successive reflection from the surface 23 and a mirrored surface 27 of the prism proceeds as a ray of light 19b. Further since the bisector 27′ of the angle made by the central ray of light 19a′ in the illumination light beam 18 and that of the display light rays reflected from the mirrored surface 27 which coincides with the finder optical axis 19a is normal to the plane of the mirrored surface 27, it is understandable from the simple geometric consideration that the above-described conditions are satisfied when the following requirement is fulfilled:

$$\delta_1 \geq \tfrac{1}{2} \left\{ \sin^{-1}\left(\frac{1}{n}\right) + \frac{\alpha}{2} \right\}$$

Now assuming that the material of the display plate 6 is acrylic resin, we have:

$n \approx 1.49; \alpha/2 = 5.5°$.

Hence $\delta_1 \geq 22.5°$. Unlike the optimum display state where the finder window is uniformly illuminated by the display light beam of cross-section ranging from 19b to 19c as has been mentioned above it may be otherwise stipulated that the limitation of actual utility of the display light beam is to illuminate at least a half of the finder window in either dimension. Then, as the illumination light ray 19b′ is required to be reflected to the display light ray 19a, we have $$\delta_1 \geq \tfrac{1}{2} \sin^{-1}\left(\frac{1}{n}\right)$$

Turning here to the case of the optimum condition again, since the angle of incidence of the central ray 19a′ in the illumination light beam 18 on the reflection surface of the prism 27 is equal to $\delta_1$, it is readily understood that when $\delta_1 = 23°$, the reflectance is found to be about 4% by taking the average of the P- and S-polarized lights. In such case, an increase in the brightness of the display may be achieved by applying a pro-reflection coating on the reflection surface of the prism 27. It should be pointed out that the angle $\delta_2$ of the other surface 28 of the prism with the lower surface 24 of the display plate 6 is preferably larger than the angle $\delta_3$ of that of the illumination light rays 18, 19c′ which after reflection from the reflection surface 27 of the prism becomes the display light ray 19c with the lower surface 24 of the said display plate. In a typical example, it is found that $\delta_1 = 25.5°$ and $\delta_2 = 90°$.

Turning to FIG. 3(a) again, the illumination condition will be described. In FIG. 3(a), an equivalent optical path to the illumination light path transmitting in the interior of the display plate 6 while being reflected totally from the boundary surfaces is depicted ideally on the extrapolation of the illumination optical axis. The display presenting portion 17 is translated to 17′. With the help of this, the condition for illumination may be expressed as: The light ray on the illumination optical axis is after the reflection from the mirrored surface of the prism to proceed along the finder optical axis 19a, and the entire area of the information mark pattern can be illuminated as uniformly as possible. What is further desired is to limit the degree of convergence of the illumination light rays to each point of the display presenting portion 17′ to α or thereabout. These requirements are fulfilled by adjusting the illumination light source 12, projection lens 26, light-introduction prism 22, the thickness of the display plate 6 and the angle of incidence of the illumination light 18 on the display presenting portion 17. One method of establishing the angle of convergence α of the light beam on each point of the display presenting portion 17 and at the same time the uniformity of illumination over the entire area of the display presenting portion 17 is to configure the projection lens 26 to such dimensions in the diameter of aperture opening D and the focal length that as the effective area of the light source is of a size S, an image of the filament S of the lamp 12 is formed on the plane P0′ in enlargement to a size S′, sufficiently covering the entire area of the display presenting portion 17′, and the light beam from the projection lens 26 converges to the P0′ at an angle of about α. An alternate method is that the illumination light entrance face of the introduction prism 22 is made to be a diffusion surface. A further alternate method is that the reflection surface of the microprism (indicated at 27 of FIG. 3(b)) is made to be a diffusion surface. The diffusibility of this surface may be differentiated between the planes parallel with and perpendicular to the paper plane, if the necessity arises, as viewed in FIG. 3(a).

Now, when we call the display system whose reflection surface (indicated at 27 in FIG. 3(b)) is made mirrored as has been mentioned above the mirror type, we find that there is another system which may be called the total reflection type.

Figure 4:
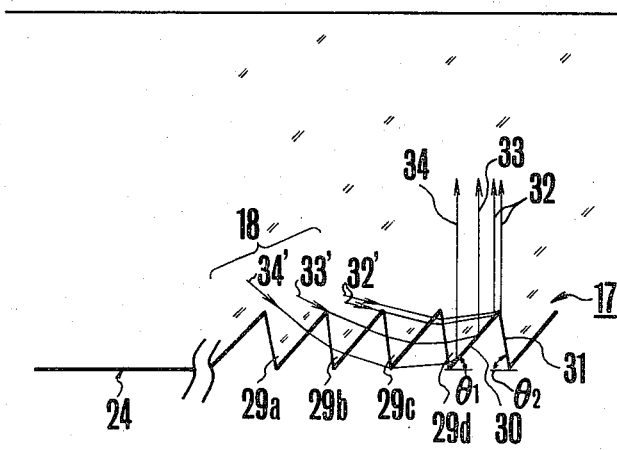
FIG. 4 is a sectional view in an enlarged scale of another embodiment of the above-described information mark display presenting portion.
Figure 5:
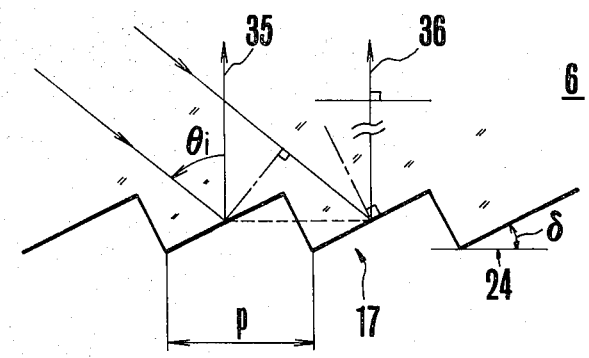
FIG. 5 is a fragmentary view in a greatly enlarged scale of the information mark display presenting portion of FIGS. 3(a) and 3(b) showing the relation of the pitch and inclination angle of the prism with the illumination light beam and display light.

Next, explanation is given to this total reflection type system by reference to FIG. 4.

In FIG. 4, for the purpose of clarity, among the illumination light rays 18, only those which exit in the finder optical axis direction are selected for explanation of the behavior thereof in connection with microprisms 29a to 29d. In this example, the reflection surface 30 for display is not treated by depositing means or the like so that the illumination light is directed to the finder optical axis direction by the total reflection. In this figure, the reflection surface 30 for display makes an angle $\Gamma_1$ with the lower surface 24, this angle being, for example, 48°, and the opposite surface 31 makes an angle of, for example, 85° with the lower surface 24 of said display plate 6. At this time, those of the light rays which after having been totally reflected exit parallel to the optical axis of the finder includes roughly three kinds of light rays. That is, the ray 32 reflected from the reflection surface 30 of the prism 29d which can be traced back through the prism 29c one ahead of the prism 29d to a ray 32′ incident on that prism 29c at an angle of about 11.8° with the lower surface 24 of the display plate 6, the reflected ray 33 coming from a ray 33′ incident on the two-ahead prism 29b at an angle of about 27.8° with respect to the same surface 24 of the display plate 6 and passing through said prisms 29b and 29c, and the reflected ray coming from the ray 34' incident on the three-ahead prism 29a of the prism 29d at an angle of about 46.6° with respect to the lower surface of the display plate 6 and having passed through said prisms 29a, 29b and 29c. The illumination conditions are determined likewise as has been described in connection with the mirror type system of FIGS. 3(a) and (b).

With either the mirror type or the total reflection type, when the finder is looked through, the information mark pattern of the portion 17 of FIG. 2 blocks the finder image forming light beam so that as the light source 12 is lighted off, the pattern is darkened by the obscuring effect. This "obscuring" effect is utilized in clearly indicating the target area A of the focus detecting device 13 in the field of view of the finder. Then, when the focus detecting device 13 produces an actuating signal representative of the detection of the sharp focus condition, the light source 12 is lighted on to illuminate the mark pattern of the portion 17, thereby the clear display of that information is presented to the operator and he is aware of the fact that the in-focus condition is attained.

It is noted here that the microprisms in either the mirror type or the total reflection type are made up with a pitch of 30 microns. This value of pitch is almost equal to that of the Fresnel lens on the focusing screen 5. Therefore, the operator looking through the finder hardly senses the structure of the prism arrangement, and a simple production technique is sufficient. In this connection, it should be explained that on the assumption that this microprism array is replaced by a blazed diffraction grating of 30 microns pitch, the requirement for the tolerance of the pitch p and inclination angle δ of the reflection surface of the grating is considerably rigorous. That is, for example, the light source is a red light emitting diode with the central wavelength of the light emission spectrum at $\lambda = 0.66$ microns, and the grating has a pitch $p = 30$ microns, and an inclination angle $\delta = 25.08°$, and the direction of reflection is parallel with the optical axis of the finder. Then, as the refractive index of the acrylic resin is $n = 1.49$, the blazed condition is satisfied when the angle of incidence $\theta i$ takes a value of $2\delta = 50.16°$. At this time, from the equation $np \cos(90° - 2\delta)/\lambda = m$ (m: the positive integer), we have the difference between the optical pathes of the central rays 35 and 36 reflected from the successive inclined surfaces as determined to be 19.22 microns $= 52\lambda n$ ($\lambda n = \lambda/n$). In this case, if the pitch error is, for example, about 1%, or about 0.3 microns, the optical path difference is caused to deviate from an integer multiple of the wavelength by about $\frac{1}{2}\lambda n$. Thus, the blazed condition is not satisfied. Such amount of error of the pitch p and inclination angle δ, is not desirable for the diffraction grating, but is not always unfavorable for the function of the display plate. That is, as the pitch p and inclination angle δ vary at random, the diffraction grating aspect of the display plate is diluted, and the wavelength dependent property and the angle selection characteristics are weakened with the resulting distribution of the display light over the visible observation area being made more uniform advantageously.

It is noted that in the construction described above, the top line of the microprisms forming the information mark display presenting portion 17 is not necessarily linear but may be curved to some extent (that is, the reflection surface 27 (FIG. 3(b)) or 30 (FIG. 4) of each prism may be made out of the perfect flatness to be a cylindrical surface having an appropriate curvature). That is, in FIG. 3(a), a point Pu at the center of the area of the pupil of the illumination system is projected onto the equivalent plane in the developed view of the optical path to the lower surface of the display plate 24 at a point Pu'. With this, we can understand that the curvatures imparted thereto have radii $\overline{Pu'P0'}$, ... with the center of the point Pu'. Of course, the same applies when the point light source lies at Pu.

Further, though the foregoing explanation directed to the display has been made by using the one-dimensional microprisms, it is also possible to use two-dimensional microprisms, for example, trigonal and quadrangular pyramid microprisms as arranged to selectively present different displays at almost the same location. That is, as shown in FIG. 7, the quadrangular pyramid microprisms are each oriented to provide two distinct inclined surfaces for respective illumination light beams of different direction from each other and, if necessary, different wavelength so that the corresponding two informations of different significance can be selectively displayed.

Figure 7:
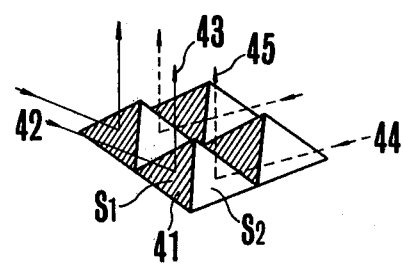
FIG. 7 is a fragmentary perspective view of a further embodiment of the above-described information mark display presenting portion.

In more detail, in FIG. 7, 41 is one of a great number of quandrangular pyramid prisms. The prism 41 has one face S1 on which an illumination light ray 42 is incident and from which it is then reflected as a light beam 43 for display to an eye of the observer. Another illumination light ray 44 is directed to be incident upon another face S2 of the same prism 41 and is then reflected therefrom as a light beam for display 45 to the same eye. Therefore, with a circular area in which a great number of minute quadrangular pyramid prisms each similar in construction and orientation to that prism 41 are provided in intimately contact relation with each other, when a blue light is selected for use as the illumination light 42, and a red light as the illumination light 44, as the blue and red lights are selectively given, the circular area changes its color from the red to the blue or vice versa, presenting displays of different significance.

Figure 6:
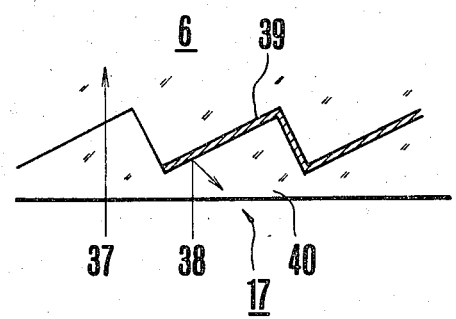
FIG. 6 is a fragmentary sectional view of still another embodiment of the above-described information mark display presenting portion.

It is further noted that in the process for making the above-described information mark display presenting portion 17, the provision of microprisms just in the interior of the boundary of the information mark pattern suffices, but in the case of the mirror type system for example, as shown in FIG. 6, not only the mark pattern but also its surrounding is provided with a prism portion. Then, a mirror coating is applied by the deposition treatment to the only mark pattern area. After that, the prisms are all buried in a material 40 having almost the same refractive index as that of the substrate plate 6 so that upon illumination the pattern portion only is made brilliant. That is, with the display plate of such construction, of the light rays 37 and 38 contributing to form a finder image, the light ray 38 is shut out by the mirrored surface 39 of the display presenting portion 17, while the light ray 37 passing through the covering material 40 proceeds through the display plate 6 without the reflection from the inclined surface of the microprism.

The present invention has been described in connection with the embodiment where the invention mark display presenting portion 17 is formed with an array of microprisms in the lower surace of the display plate 6 and therefore the presentation of the information mark display is controlled by the reflection of the illumination light from the inclined surfaces (27, 30) of the microprisms. Besides this, for example, said information mark display presenting portion 17 is further provided with a similar array of microprisms on the upper surface of the display plate 6 so that the refracting action of each microprism on the illumination light beam 18 is utilized in controlling the presentation of the display. A further example of modification is that in the example of modification just described above, the above-described information mark display presenting portion 17 is otherwise illuminated from the diagonal below by the light beam 10 18 from the illumination light source 12, whereby the light refracting action of each prism is utilized in presenting the information mark display.

Figure 8:
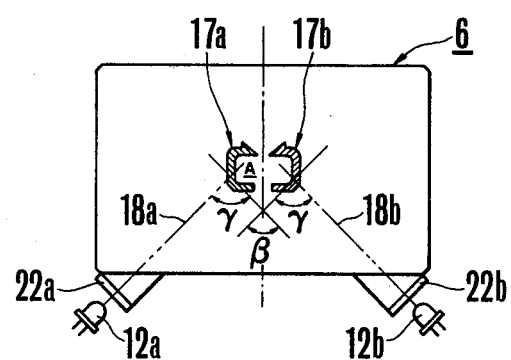
FIG. 8 is an elevational view of another embodiment of the above-described information mark display device applicable to the camera of FIG. 1.

Finally, another example of configuration of the information mark display presenting portion 17 applicable to the camera of FIG. 1 will next be described by reference to FIG. 8. The here illustrated example is to construct the above-described information mark display presenting portion in the form of two distinct sections, of which the first is adapted to indicate the detection of the rear focus condition (which, in this instance, represents the sharp image of the object formed by the above-described taking lens 2 lying on the rear side of the focal plane) and of which the second is adapted to indicate the detection of the front focus condition (which, in this instance, represents the sharp image of the object formed by the photo-taking lens 2 lying on the front side of the focal plane). In addition thereto, these first and second sections of the information mark display presenting portion are configured to respective patterns defining the target area of the focus detecting device 13 in the field of view of the finder. That is, in that figure, 17a is the first information mark display presenting portion for the display of the above-described rear focus condition. Here, as illustrated, this is configured to a mark pattern of an arrow representing the direction of rotation (in this instance, the clockwise direction) of a focus adjusting means (not shown) which causes the photo-taking lens 2 to axially move forward and therefore to be brought from the rear focus to the in-focus condition. On the other hand, 17 is the second information mark display presenting portion for the display of the above-described front focus condition. Here, as illustrated, this is configured to a mark pattern of an arrow representing the direction of rotation (in this instance, the counterclockwise direction) of the focusing ring which causes the photo-taking lens to move rearward and to be brought from the front focus to the in-focus condition. Moreover, at this time, said first and said second display presenting portions 17a and 17b when combined with each other provides the definition of the target area of the focus detecting device 13 as an area A in the field of view of the finder.

It is noted here that since the above-described first and second display presenting portions 17a and 17b are formed with the arrays of microprisms in a similar fashion to that described in connection with the above-described embodiment, one of the features of this embodiment is that as schematically shown by the hatching, the top line of each microprism in the first display portion 17a and the top line of each prism in the second display portion 17b are so oriented as to make an angle $\beta$. Another feature is that the first display portion 17a is provided with a first illumination light source 12a which is lighted on by the output of the above-described focus detecting device 13 when the rear focus condition of the photo-taking lens 2 is detected with its illumination direction making an angle $\gamma$ with the top line of the microprism in the said first display portion 17a, and the second display portion 17b is provided with a second illumination light source 12b which is lighted on by the output of the focus detecting device 13 when the front focus condition of the taking lens 2 is detected with its illumination direction making the same angle $\gamma$ with the top line of the microprism in the second display portion 17b. These light sources 12a and 12b are arranged in opposition to the respective light introducing prisms 22a and 22b. In practice, for example, $\beta = \gamma \approx 90°$. Therefore, the illumination light beam 18a from the first light source 12a has no effect on the second display portion 17b since its prisms have the top lines almost parallel to the direction of illumination light beam 18a, but acts on the only first display portion 17a. And, the illumination light beam 18a from the second light source 12b, because of the same reason, acts on the only second display portion 17b. Thus, the selective actuation of the light sources 12a and 12b results in selectively presenting the displays of the rear and front focus conditions by the display portions 17a and 17b. It is noted that in actual practice, the angle of incidence of the illumination light beam 18a from the first light source 12a on the second display portion 17b, the angle of incidence of the illumination light beam 18b from the second light source 12b on the first display portion 17a, and the angle of inclination of the reflection surface of each microprism provide means for calculating the angle of exit of the reflected light from said reflection surface for the other illumination light beams 18a and 18b. Therefore, the $\beta$ can be increased or decreased, provided that the reflected light does not enter the finder window of FIG. 1.

When the above-described light sources 12a and 12b are lighted off, the field of view of the finder is "obscured" in the areas corresponding to the above-described display presenting portions 17a and 17b. But this serves to indicate the target area of the focus detecting device 13. In order to indicate when the in-focus condition is attained, both of the light sources 12a and 12b may be lighted on, or off, depending upon the type of the focus detecting device 13. Since the above-described functions of the focus detecting device 13 are well known in the art, a more detailed explanation is not given here.

It will be appreciated from the foregoing detailed description that according to the present invention, the information mark display device can be manufactured at a lower cost and without the necessity of a higher level of technique particularly regarding the display presenting portion than when the volume hologram, relief hologram, or similar diffraction means is utilized. Particularly from the type of information mark display device that has been described in the opening paragraphs can a great advantage be expected.

Since the complete removal of the "obscuring" phenomenon from the field of view of the finder is generally impossible, the present invention contemplates the reverse use of this "obscuring" phenomenon with the essential advantage when in application to the purposes described in connection with the above embodiments.

Although the embodiments of the invention have been described as applied to the photographic cameras and particularly the focus detecting device-equipped single lens reflex cameras, as the built-in-finder type focus condition display device, it is to be understood that the present invention is not confined to such examples of application but is applicable to various fields such as various meters.

What is claimed is:

1. An information mark display device provided with an information mark display presenting portion formed in a portion of at least one surface of a flat plane-like transparent substrate to a shape representing an information to be displayed, whereby when said display presenting portion is illuminated, the display of said information is presented, said device comprising:
   an information mark display portion formed by an array of microprisms, each of the microprisms forming said display portion having at least one inclined surface as the information display control surface; and
   an illumination light source for illuminating the above-described information mark display portion, an illumination light beam from said illumination light source being caused by the above-described inclined surfaces of the microprisms to exit in a direction of an observation axis.

2. An information mark display device as described in claim 1, further including:
   light-introducing optical means provided on one side of said transparent substrate, the above-described illumination light beam from the illumination light source being conducted through said means to said transparent substrate.

3. An information mark display device as described in claim 2, wherein said transparent substrate conducts the illumination light beam by total reflection to the above-described information mark display portion.

4. An information mark display device as described in claim 3, wherein said microprisms have inclined surfaces which are mirrored.

5. An information mark display device as described in claim 4, wherein said microprisms have inclined surfaces satisfying:

$$\delta_1 \geq \tfrac{1}{2} \sin^{-1}\left(\frac{1}{n}\right)$$

where $\delta_1$ is the angle of inclination of the inclined surface with the plate surface of said transparent substrate, and n is the index of refraction of said transparent substrate.

6. An information mark display device as described in claim 5, wherein said microprisms have inclined surfaces which are treated for an increase in reflectance.

7. An information mark display device as described in claim 3, wherein said information mark display portion is configured to indicate a target area of focus detecting means.

8. An information mark display device as described in claim 7, wherein said illumination light source is lighted on when said focus detecting means detects a sharp focus.

9. An information mark display device as described in claim 3, wherein said microprisms have inclined surface which totally reflect the illumination light beam of said light source after having been refracted by other microprisms positioned nearer to said illumination light source than said microprisms.

10. An information mark display device provided with an information mark display presenting portion formed in a portion of at least one surface of a flat plate-like transparent substrate to a shape representing an information to be displayed, said device including:
    a first information mark display presenting portion formed by an array of microprisms, the microprisms forming said portion each having one inclined surface as the information display control surface;
    a second information mark display presenting portion formed by an array of microprisms, the microprisms forming said display presenting portion each having one inclined surface as the information display control surface with its top line oriented to make a predetermined angle with the top line of the microprism in said first information mark display presenting portion;
    a first illumination light source for illuminating said first information mark display presenting portion, said illumination light source being arranged to face at the inclined surfaces of the microprisms forming said first information mark display presenting portion; and
    a second illumination light source for illuminating said second information mark display presenting portion, said illuminating light source being arranged to face at the inclined surfaces of the microprisms forming the above-described second information mark display presenting portion.

11. An information mark display device as described in claim 10, further including:
    focus detecting means, said means actuating said first light source to light on when an object image formed by a photo-taking lens lies behind a film plane, and actuating said second light source to light on when the object image lies ahead of the film plane.

12. An information mark display device as described in claim 11, wherein said first and said second information mark display presenting portions define a target area of said focus detecting means.

* * * * *